US009133067B2

(12) United States Patent
Schulmann

(10) Patent No.: US 9,133,067 B2
(45) Date of Patent: Sep. 15, 2015

(54) ORGANIC FERTILIZER AND METHOD OF ITS PRODUCTION

(75) Inventor: Jan Schulmann, Prague 6-Suchdol (CZ)

(73) Assignee: MANETECH, A.S., Prague (CZ)

(*) Notice: Subject to any disclaimer, the term of this patent is extended or adjusted under 35 U.S.C. 154(b) by 49 days.

(21) Appl. No.: 13/880,564

(22) PCT Filed: Oct. 17, 2011

(86) PCT No.: PCT/CZ2011/000101
§ 371 (c)(1),
(2), (4) Date: Apr. 19, 2013

(87) PCT Pub. No.: WO2012/055379
PCT Pub. Date: May 3, 2012

(65) Prior Publication Data
US 2013/0199255 A1    Aug. 8, 2013

(30) Foreign Application Priority Data
Oct. 26, 2010 (CZ) .................................... 2010-778

(51) Int. Cl.
C05F 7/00    (2006.01)
C05F 17/00   (2006.01)
C05F 11/00   (2006.01)
C05D 9/00    (2006.01)

(52) U.S. Cl.
CPC .............. *C05F 17/0018* (2013.01); *C05D 9/00* (2013.01); *C05F 7/00* (2013.01); *C05F 17/0027* (2013.01); *Y02W 30/43* (2015.05)

(58) Field of Classification Search
CPC .... C05F 17/0018; C05F 17/0027; C05F 7/00; C05F 11/00; C05D 9/00; Y02W 30/43
USPC ....................................................... 71/11–26
See application file for complete search history.

(56) References Cited

U.S. PATENT DOCUMENTS

| 2,861,877 A | 11/1958 | Geraghty et al. |
| 3,963,470 A | 6/1976 | Haug |
| 4,053,394 A | 10/1977 | Fisk |
| 5,810,903 A | 9/1998 | Branconnier et al. |

FOREIGN PATENT DOCUMENTS

| DE | 4224368 A1 | 1/1994 |
| EP | 0535544 A1 | 4/1993 |
| EP | 0683144 A1 | 11/1995 |
| EP | 1350778 A1 | 10/2003 |
| FR | 2288719 A1 | 5/1975 |
| GB | 513139 A | 10/1939 |
| GB | 1498938 A | 1/1978 |
| WO | 8806148 | 8/1988 |
| WO | 2004041995 A1 | 5/2004 |

OTHER PUBLICATIONS

Fertiliser Manual (RB209) Biosolids—total and available nutrients. Agricultural Document Library. University of Hertfordshire, 2011.*
International Search Report (Mar. 21, 2012) for corresponding International application No. PCT/CZ2011/000101.
Search Report (Jun. 28, 2011) for corresponding Czech Republic App. PV 2010-778.

* cited by examiner

*Primary Examiner* — Jennifer A Smith
(74) *Attorney, Agent, or Firm* — WRB-IP LLP

(57) ABSTRACT

Organic fertilizer is produced through composting natural lignocellulose material and liquid wastes especially from livestock production, which has a content of minimum 35% dry matter, minimum 25 weight % of organic material, minimum 20 weight % of humus and minimum 1.5 weight % of nitrogen. The organic fertilizer is produced by spraying sorbent material with waste water, that is livestock waste water or food industry waste water or water cleaning plant sludges. The waste water contains a minimum of 20% weight of livestock waste water, which is homogenized with agent, which includes materials based on starch derivates or cellulose derivates, which increase thixotrophy and surface tension of this waste water and separators, which prevent creation of clusters and increase solubility of starch or cellulose derivates. Sorbent material with waste water is mixed, aerated and decomposed by aerobic bacterial activity in at least four cycles.

9 Claims, No Drawings

ORGANIC FERTILIZER AND METHOD OF ITS PRODUCTION

BACKGROUND AND SUMMARY

Organic fertilizer based on natural lignocellulose material and liquid wastes, for example from agricultural production and livestock production are provided.

Plant residuals decompose and create humus. Humus improves plant nutrition by slowly releasing nitrogen, phosphorus and various trace elements. Humus also dissolves soil minerals, improves soil structure and improves soil water retention while its dark color improves temperature sensitivity.

Humus has a much higher biological activity than mineral fertilizers. Routinely, humus is made of a mixture of straw and animal excrements which decompose in the soil with the help of different microorganisms, worms, insects and larvae. Although industrial preparation of humus is often conducted by machinery, its offending odor makes it unpleasant.

In current formulations, plant wastes such as straw, hay, green communal wastes, kitchen and household waste, water cleaning plant sludge, wooden bits and sawdust can be composted.

The aerobic processes of decomposition cause compostation of biological materials.

For quality decomposition of composted materials it is important to keep appropriate moisture in the compost, allow access of materials to air, and sustain a suitable ratio between carbon and nitrogen.

Compost moisture is related to the humidity to air. If compost is too wet, it does not allow sufficient access to air, which is necessary to aerobic microorganisms. Anaerobic decomposition continues, and unwanted smelly moldy matter is created. The ratio C:N (carbon:nitrogen) influences intensity of microorganism activity, and therefore compost ripening time and creation of humus material. Optimally, C:N=20 or 30:1. Soil can be added to compost, which may aid water retention and reduce odor.

Plant material can be disintegrated before composting. Disintegration improves the access of microorganisms to both plant material and air. The composting material can also be aerated and homogenized in order to give it access to air.

Under conventional conditions, decomposition can take 3-4 weeks. Reacting microorganisms cause a rising of temperature in the compost in a range up, for example, to 50° to 70° C., while sugars, starch and protein fixed in the organic matter are decomposed. The temperature decreases during approximately the 4th to 10th weeks, and compost turns a brown color with a crumbly texture. Current compost producers process biologically decomposable communal waste and communal green waste and water cleaning plants sludge.

Problems with fluid wastages include organic contamination, especially slurry-waste water from livestock farms, are generally well known. Such waste is a serious operational and ecological problem. To date, there has not been a reliable way to dispose of or process this waste.

For instance livestock slurry is applied to fields, biological processes are used either anaerobically in biogas digestors or aerobically in cleaning plants. Anaerobic uses are the most common in agriculture practices. However this brings serious ecological and economic disadvantages, such as:

contamination of large areas with organic and inorganic material danger of contamination in water sources unpleasant odor affecting large areas most of the nutritional value of slurry is lost in washout, which leads to the necessary application of industrial fertilizers that are subsequently also partly washed out, significantly reducing the effect of their nutrients.

Anaerobic systems are usually connected with production of biogas, which entails a large investment. Apart from investment, these systems incur high operational costs.

Aerobic systems require large investments into building aerobic tanks and acquiring aerobic facilities. The main disadvantage of these systems is that their cleaning effect depends on outside temperature. Aerobic technologies do not work reliably in winter conditions and cleaning is ineffective.

In embodiments described in Patent No. CZ266152, water is treated with active carbon or in combination with betonies. In embodiments described in Patent. No. AO 190083, water is treated with an ion exchanger. According to the Patent No. CZ 266153, water can be treated with hydroxide or oxide calcium.

Patent No, CZ 277555 describes liquidation of waste water, especially from the food industry and from livestock production. Waste water is homogenized with material increasing thixotropy, and with water cleaning plants activated. This type of mixture is applied in one or more batches on sorbent material while being aired in weight of a ratio of 8 to 10 parts of water to 1 part of sorbent material. Suitable sorbent materials include straw, corn stover, disintegrated wooden materials or agricultural wastes.

Disadvantage of this process include a low ratio of liquidated waste water to sorbent material (8-10:1).

In various embodiments, disclosed methods of organic fertilizer production brings realistic possibilities for the elimination of this negative ecological impact. Using this substrate for fertilizing effectively can result in natural renewal of soil quality and relieves contamination of subsoil water sources.

DETAILED DESCRIPTION

Organic fertilizer and method of its production is described herein.

Organic fertilizer produced through composting natural lignocellulose material and liquid wastes especially from livestock production contains a minimum of 35% w/w dry matter, 25% w/w of organic material, minimum of 20% w/w of humus and 1.5% w/w of nitrogen.

Biologically active humus created by microbiological activity can be measured by determining the quantity of organic matter in a mixture. In various embodiments, the amount of organic matter can be determined by measuring the Cox oxidized by sulphur and chromium acid using a 1.7 coefficient.

Organic fertilizer can be produced by spraying sorbent material with waste water, which contains at least 20% weight of livestock waste water, that is homogenized with agent to form a mixture. Such agents include materials such as starch derivates or cellulose derivates, which increase thixotrophy and surface tension of the waste water and separators. Separators can be designed to inhibit the creation of clusters and increase solubility of starch or cellulose derivates.

The resulting mixture is mixed, aerated and decomposed by aerobic bacterial activity for at least four cycles. During the first cycle, the waste water is applied over sorbent material, in one or more batches, and the mixture is then mixed and aerated. The weight ratio of water to sorbent material is between 8 and 10 weight parts to 1 weight part of sorbent material.

In certain variations, when temperature reaches at least approximately 50° C. and after 2 to 4 weeks, the material is mixed in a second cycle with the addition of waste water with the total weight ratio to the original sorbent material of 6 to 8:1 and aeration. After 2 to 4 weeks depending on climate conditions, when the compost mixture reaches at least about 50° C., a 3rd and 4th cycle can be conducted. In the 3rd cycle, the composted material is mixed with one or more batches of waste water with the total weight ratio to the original sorbent material of 4 to 6:1. In the fourth cycle the total weight ratio of 2 to 4:1. When the process is finished, the final weight ratio of modified waste water to original sorbent material is somewhere between 20:1 and 30:1.

Livestock slurry can be mixed with waste water from the food industry or with communal waste water. In various embodiments, waste water has a content of cleaning liquids and/or disinfectants of not more than 0.01%.

In various embodiments, the sorbent material can be chosen from a group of materials such as grain straw, rape straw, rice straw and corn stover. Up to 30% of these materials can be replaced by disintegrated wooden material or communal waste, communal and gardens green waste, other corn waste or seaweed.

In various embodiments, as material increasing thixotrophy and surface tension termically modified oxidized starch in the amount of 360 to 450 g/1000 kg of livestock waste water can be used. A mixture of bentonite and sodium bicarbonate can also be used as a separator.

Composting can be intermittent or continuous. Continuous composting can be accomplished using a composting machine such as a windrow turner. Composting machines can shred sorbent material, inject, and/or mix waste water into sorbent material while simultaneously aerating the mixture. Fluctuation of temperature during each cycle is reduced and the ratio of waste water to sorbent material can be a minimum of 25:1.

In various embodiments, livestock waste water is made of the suspension of undigested food residuals in water phase. Dry matter content can depend on variables such as the types of food, feeding and watering technology used, etc. Dry matter content is generally within 8 to 15% of weight for beef cattle, 3 to 12% of weight for pigs and 10 to 25% for poultry. The content of various chemical compounds can change qualitatively and quantitatively. Important compounds from following fertilizing effect point of view are found in all types of livestock waste waters. These compounds include urea and from it generated ammonia. Also contains phosphorus, potassium, magnesium, calcium and other organic substances.

Accompanying physical effect is amoniac evaporation with some organic materials, namely odor-causing fatty acids. Chemical and physical characteristics change with time. These changes are mainly caused by ongoing microbiological processes. Fresh waste water from livestock farms has a pH of around 7, and contains urease enzymes that release ammonia from urea. Low molecule fatty acids evaporate with ammonia and they cause the odor.

Author invention found, that evaporation of ammonia and fatty acids can be decreased by adding a derivative of starch or cellulose. The starch or cellulose derivative increases surface tension, and increases thixotrophy, density and cohesion of livestock waste water to sorbent material. These substances cannot be easily dispersed in liquid, which negatively influences solubility. To improve solubility these substances can be mixed with separators such as bentonite and sodium bicarbonate.

The functions of an agents added into livestock waste water cover three areas of properties. Mainly the agents adjust surface tension, thixotrophy and slurry viscosity, which results in a significant increase in binding capacity on sorbent material.

The agents also increases activity of microflora in livestock waste water. By adding polysaccharides, fast bacteria growth increases. Bacterial growth is used in aerobic fermentation of lignocellulose sorbent materials.

And last but not least, these agents limit odor, that accompanies the processing of livestock waste water and limits loss of nitrogen through ammonia evaporation.

Fast reproducing microorganisms continue to develop on this nutritious media containing the agent. The bacterial families Bacterioidaceae and Peptococcaceae are capable of decomposing cellulose and that is their function in the alimentary tracts of farm animals.

Multiplication of Bacterioidaceae and Peptococcaceae is in the beginning of decomposition supported by the presence of oxygen. Fermentation process on of lignocellulose matter results in a fast rise in temperature and reduction of water, because water is evaporated and it is used by multiplying microorganisms. During the fermentation process is to convert ammonia nitrogen into organic complex, and microbiological degradation of lignose is to convert ammonia nitrogen into organic and complex, occurs from the absorbent material and the emergence of humine.

In certain embodiments, at least 20% of livestock waste water is not older than 2 months (or alternatively 30% in winter months) to provide conditions for a successful fermentation process that transforms livestock waste water into a fertilizing substrate. Older livestock waste water looses speed of fissile microbial processes by 30% every day. Older waste water also looses nitrogen due to ammonia evaporation. This causes a lower content of nitrogen in the final organic fertilizer and reduces the effectiveness of the material as fertilizer.

During the first application of waste water on organic sorbent material such as straw, corn stover or sawdust, the water to sorbent ratio can depend on the sorbent material used. During the first phase of saturation the ratio of 4 to 7 weight parts of livestock waste water to 1 part of sawdust can be reached. For straw the livestock waste water straw ratio can be 7:1 to 10:1 w/w.

Although the mixture has characteristics of fertilizer even after the first cycle, the sorbent material is not fully decomposed and the sorbent capacity is not exhausted. Another dosage of waste water can be added. The temperatures peak in a range between 50° C. and 70° C. This results in the repeated destruction/inactivation of pathogenous and conditionally pathogenous microorganisms and weed seeds. This also results in an increase in the content of nutrients, especially nitrogen bound in organic complex, content of ammonia nitrogen is less than 3% of total nitrogen.

This also results in an increase humic acids, resulting from the decomposition of lignocellulose material under favorably increased temperatures. A higher humic acids content improves the transfer of nutrients from the soil into plants. Some fractions of humic acids created with heavy metals salts are not soluble in water and slow down the circulation of heavy metals in the food chain.

Ammonia nitrogen is transformed into a non water-soluble organic complex, which means no or negligible loss of nutrients during the storage period.

Adjustment of thixotropic characteristics of waste water increases density and the adhesive capacity to sorbent material. Derivates of cellulose and starch are advantageous.

Produced organic fertilizer can be storied on field sites and is able substitute or radically limit application of standard industrial fertilizers.

Nutrient experiments running confirm an increase in green matter growth or product volume by 20 to 25%.

The final organic fertilizer product renews the biological balance in soil and amount of humus. When the fertilizer product is applied, it reduces or prevents the leakage of nitrogenous and other inorganic, substances into subsurface water resources. The final organic fertilizer keeps favorable relative humidity in the soil.

During the production of organic fertilizer, weed seeds are destroyed through the fermentation process.

Production of organic fertilizer enables the liquidation of livestock waste water by transforming livestock waste water, or its mixture with communal waste water, into a solid substrate. Unpleasant odor is eliminated during waste water processing, and its nutrients are retained in solid, organic fertilizer.

Organic fertilizer can be used according to time needs of agricultural practices. The production of organic fertilizer can be conducted close to livestock farms. In other embodiments, it is possible to process other liquid wastes with organic contamination.

EXAMPLES

The following examples are for illustration only, and are not meant to limit the disclosure or any embodiments thereof.

Example 1

Pig slurry with 5% dry matter was mixed with 400 g of agent per 1 metric ton of waste water. The agent was a thixotropic agent that contained 89 w/w % termically adjusted by adding oxidized starch, 6 w/w % bentonit and 5 w/w % sodium bicarbonate. Waste water was mixed for 2 hours with the thixotropic agent.

Modified waste water was applied on rape and grain straw in a ratio of 10:1 w/w while the mixture was continuously aerated. The fermentation process started after 27 hours. After 4 days as the outside temperature reached 20° C., the temperature inside the composted material reached 62° C. During the next cycle, additional modified waste water was applied on composted mixture to the original sorbent material at a ratio of 8:1 w/w while the mixture was continuously aerated. Within twenty hours, the temperature of the composted mixture reached 65° C. After another 14 days and regular aeration, additional modified waste water was applied on the composted mixture at a ratio of 5:1 w/w to the original sorbent material weight. A 4th cycle was repeated again after three weeks. Once again additional waste water was applied to the composted mixture at a ratio of 4:1 relative to the original sorbent material weight. In total, there were 27 weight parts of waste water applied over 1 part of sorbent material. 20% of the pig slurry was replaced in the second and fourth cycle by other waste water from agriculture production and waste water from production of potato chips.

The organic fertilizer had a 37% w/w dry matter content, 25% w/w organic substances, 22% w/w humus and 2% w/w nitrogen.

Livestock waste water ought to be processed within 14 days to preserve nutritional values. Mixing can be conducted by any method known in the art, including by pumps and/or mixers. Modified slurry can then be transported and/or applied over the sorbent material in any format, such as in tanks (e.g. mobile tanks). The mixing of sorbent material with the applied slurry can be done by mechanical routes, such as by using a tractor pulled rototiller. A front-loader can be used for handling the sorbent material and final substrate.

The process can be performed directly on the field, and the resulting organic fertilizer can be stored for future applications. There is no slurry leakage, and the total process can be executed even in unfavorable weather conditions (e.g. rain, snow, temperatures to −15° C.). If the site is too wet or inaccessible for heavy machinery, the process may be performed on a solid surface, in an empty silage pit, or in any other similar place.

During the production of organic fertilizer according to the invention, limestone or other compounds can be added to the composted mixture.

Example 2

Whole method of production of the organic fertilizer was continuous. Waste water was mixed into sorbent material while simultaneously aerating the mixture, fluctuation of temperature during each cycle was reduced.

A mixture of agricultural and communal waste was used as a sorbent material in weight ratio of 1:1 w/w. To begin the composting process, 100% homogenized pig slurry with agent contains termically adjusted starch with 3 weight % of betonies and 4% sodium bicarbonate was used. Two tons of treated pig slurry were applied in batches during one day over 1 metric ton of sorbent material. Subsequently, water cleaning plant sludge mixed and pig slurry in a w/w ratio of 6:4 were applied. The final mixture had a liquid phase dosage per sorbent material of 25:1 w/w.

The resulting organic fertilizer had 35 w/w dry matter content, 25% w/w organic material, 20% w/w humus, and 2.5% w/w nitrogen.

The effectiveness of the composting process can depend on physical characteristics of sorbent material. For example the effectiveness of the composting process can depend on the size of its surface in contact with air and liquid, and on its chemical composition. Effectiveness can also depend on the microbial and chemical composition of waste water and the weather. For example, wood chips have a smaller surface in contact with air and liquid than straw and as a result, the process of decomposition is slower and communal waste has lower fermenting activity than livestock waste water.

Dosages of fertilizers can be designed in conjunction with other materials. For example, the presently described formulation can be combined with an industrial fertilizer. It is possible to recommend keep up to 5% dosage of normally used industrial fertilizer and replace the rest with organic fertilizer in a ratio of between 1:8 and 1:10. This means 100 kg of industrial fertilizers can be replaced by between 800 kg and 1000 kg of organic fertilizer. As described above, organic fertilizer can be designed specifically according to the specific soil requirements so the optimal fertilizing effect can be reached.

The amount of organic fertilizer can be variably applied to soil. Likewise, the agrotechnical period of application can be varied. In various embodiments, organic fertilizer can be ploughed into the soil, applied without ploughing (e.g. by combinator or disc harrow), or spread over surface without immediate insertion into soil. Loss of nutrients, especially nitrogen is minimal to none when well matured organic fertilizer is stabilized and nitrogen is up to 99% tied into organic substances.

Existing degradation of soil due to over fertilizing with industrial fertilizers, along with application of livestock waste waters onto very large areas can reach a critical negative point. Water resources are simultaneously contaminated. The entirety of the water management system may be endangered over large areas.

Proposed production of organic fertilizer represents in this sense real possibility to eliminate negative environmental impact of livestock slurries field application and over fertilizing with industrial fertilizers at the same time. Application of this organic fertilizer solves those two pressing environmental problems, leads to natural restoration of soil quality and reduces pollution of water resources.

INDUSTRIAL APPLICABILITY

Organic fertilizer based on natural lignocellulose materials and liquid wastes namely slurries from livestock production and process of its production is applicable in agriculture and food industries.

The invention claimed is:

1. A method of making an organic fertilizer, the method comprising:
   (a) in a first cycle of at least four cycles, spraying waste water in one or more batches onto a natural lignocellulose sorbent material to form a mixture (A), and simultaneously mixing, aerating, and decomposing the mixture (A) by aerobic bacteria for 2 to 4 weeks and the temperature of the mixture (A) reaches at least 50° C.;
   (b) in a second cycle of at least four cycles, spraying additional waste water in one or more batches onto the mixture (A) to form a mixture (B), and simultaneously mixing, aerating, and decomposing the mixture (B) by aerobic bacteria for another 2 to 4 weeks and the temperature of the mixture (B) reaches at least 50° C.;
   (c) in a third cycle of at least four cycles, spraying additional waste water in one or more batches onto the mixture (B) to form a mixture (C), and simultaneously mixing, aerating, and decomposing the mixture (C) by aerobic bacteria for another 2 to 4 weeks and the temperature of the mixture (C) reaches at least 50° C.; and
   (d) in a fourth cycle of at least four cycles, spraying additional waste water in one or more batches onto the mixture (C) to form a mixture (D), and simultaneously mixing, aerating, and decomposing the mixture (D) by aerobic bacteria for another 2 to 4 weeks and the temperature of the mixture (D) reaches at least 50° C. to form an organic fertilizer;
   wherein:
   (i) a total of 8 to 10 parts by weight of the waste water, per 1 part by weight of the original sorbent material, is sprayed onto the sorbent material during the first cycle;
   (ii) a total of 6 to 8 parts by weight of the waste water, per 1 part by weight of the original sorbent material, is sprayed onto the mixture (A) during the second cycle;
   (iii) a total of 4 to 6 parts by weight of the waste water, per 1 part by weight of the original sorbent material, is sprayed onto the mixture (B) during the third cycle;
   (iv) a total of 2 to 4 parts by weight of the waste water, per 1 part by weight of the original sorbent material, is sprayed onto the mixture (C) during the fourth cycle;
   (v) a total of 20 to 30 parts by weight of the waste water, per 1 part by weight of the original sorbent material, is sprayed onto the sorbent material in the four cycles combined;
   (vi) the waste water comprises at least 20% by weight of livestock waste water and 360 to 450 g of an agent per 1000 kg of livestock waste water;
   (vii) the agent simultaneously increases thixotrophy and surface tension of the waste water, and comprises one or more starch or cellulose derivatives and 7 to 11% by weight of a separator comprising a mixture of bentonite and sodium bicarbonate;
   (viii) the separator inhibits the creation of clusters and increases the solubility of the starch or cellulose derivatives in the livestock waste water; and
   (ix) the organic fertilizer comprises a minimum of 35% by weight of dry matter, a minimum of 25% by weight of organic material, a minimum of 20% by weight of humus, and a minimum of 1.5% by weight of nitrogen.

2. The method according to claim 1, wherein the sorbent material is selected from the group consisting of grain straw, rape straw, rice straw, corn stover, disintegrated wooden material, communal waste, communal and garden green waste, and seaweed.

3. The method according to claim 2, wherein the sorbent material comprises at least 70% by weight of grain straw, rape straw, rice straw, or a combination thereof.

4. The method according to claim 1, wherein the starch derivatives comprise a thermally modified oxidized starch.

5. The method according to claim 1, which is continuous.

6. The method according to claim 5, which uses a composting machine to simultaneously shred the sorbent material, mix the waste water with the sorbent material, and aerate and decompose the mixture by aerobic bacteria.

7. The method according to claim 6, wherein fluctuation of temperature during each cycle is reduced.

8. The method according to claim 7, wherein a total of 25 to 30 parts by weight of the waste water, per 1 part by weight of the original sorbent material, is sprayed onto the sorbent material in the four cycles combined.

9. The method according to claim 1, wherein the waste water further comprises food industry waste water, sludge from communal waste water cleaning plants, or both.

* * * * *